United States Patent Office 3,533,685
Patented Oct. 13, 1970

3,533,685
VARIABLE INCIDENCE TYPE SLIT LAMP
Gert Littmann, Oberkochen, Hans Littmann, Heidenheim, Max Straube, Walther, and Hans Peter Wörner, Erbach, near Ulm, Germany, assignors to Carl Zeiss-Stiftung, Heidenheim (Brenz), Wuerttemberg, Germany, a corporation of Germany
Filed Oct. 28, 1968, Ser. No. 771,132
Claims priority, application Germany, Oct. 27, 1967, 1,278,757
Int. Cl. A61b 3/10
U.S. Cl. 351—14    9 Claims

ABSTRACT OF THE DISCLOSURE

In a slit lamp device for directing a flat beam of light to an eye being examined, illumination through a slit diaphragm is grouped in parallel rays by a first lens. A second lens coaxial with the first lens focuses the rays on the eye via a reflector which directs the rays to the eye. The reflector is pivotable and movable relatively along the optical axis of the second lens for changing the angle at which it directs the rays to the eye, and the second lens is movable along its optical axis for maintaining the focus of the rays on the eye in different axial positions of the reflector. Gears or cams coordinate the pivotal movement of the reflector and the axial movements of the first lens and of the reflector for simultaneously adjusting the focus of the rays on the reflector and shifting the pivotal and axial positions of the latter to keep the rays in focus and directed to the eye when the angle of the rays to the eye is changed.

---

The present invention relates to a slit lamp device for eye examination, by means of which a flat light beam is cast into the patient's eye and which has associated therewith a microscope for eye observation. Generally, the microscope and the slit lamp are independently pivotable about a common fixed vertical axis. The device according to the invention may be equipped with one single light source for strictly visual use. It may also be incorporated in a photo slit lamp having two light sources, the real images of which are superposed on, or in close juxtaposition to, each other.

As a rule, slit lamps of the type indicated have an illuminating system, by which only the horizontal angle of incident radiation to the patient's eye can be varied. For many examinations—for instance, the examination of the lateral chamber angle with a contact lens—it is, however, desirable to be able to vary the vertical angle of incident radiation also.

In a known slit lamp device, illustrated by the device disclosed in West German Pat No. 1,133,911, the whole illuminating system including the projection lens is mechanically pivotable about an axis optically associated with a horizontal axis passing through the patient's eye. In this device, however, the slit lamp is arranged above the optical collimation axis, and it thus has an undesired unstable equilibrium with respect to its pivotal axis.

In another known device, illustrated in West German Pat No. 1,187,038, the light source, the condenser and the slit diaphragm pivot about an axis disposed in the slit diaphragm, and the projection lens itself pivots correspondingly. With this arrangement, however, the amplitude of pivoting is limited by the tolerable aperture of the projection eyepiece. Thus, in order to attain a sufficient angle of pivoting, the diameter of the projection eyepiece must be increased to such an extent that, due to the great space requirements of the illuminating system, handling of the device is considerably impeded.

An object of the present invention is to provide a slit lamp device which does not have the above-noted disadvantages.

In accordance with the present invention, the collective effect of the projection lens of a slit lamp device is provided by two sectional lenses. The slit diaphragm is disposed at the focal point of the first sectional lens and the slit image is disposed at the focal point of the second sectional lens to produce a parallel path of rays between the two lenses. Thus, the distance of the two sectional lenses may be varied without a change in the vertex distance of the slit image of the second lens. A reflector is arranged to deflect the illumination from the lens onto the eye being examined. The vertical angle of incident radiation is changed by moving one sectional lens and the reflector in the direction of the optical axis and at the same time rotating the reflector. These movements are correlated by cams in a manner to maintain the slit image in a predetermined position.

The invention will now be described in detail with respect to the accompanying drawings in which:

FIG. 2a is a section along the lines IIa—IIa of FIG. 2;

Figure 1:
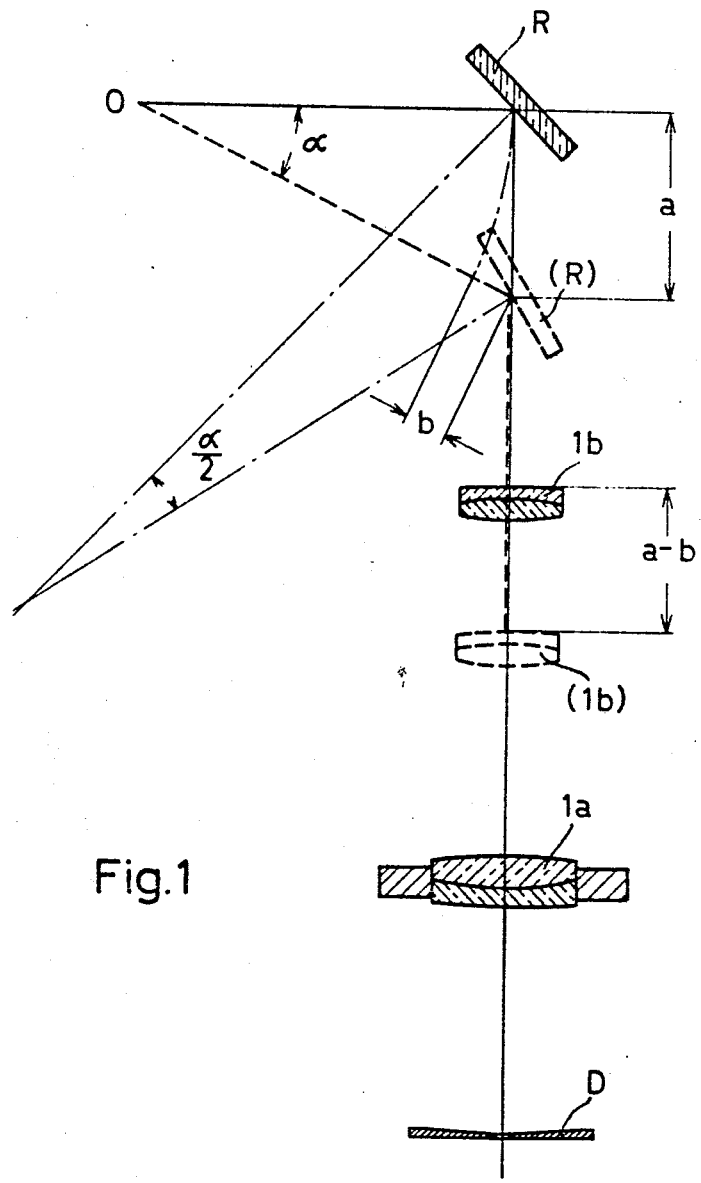
FIG. 1 is a schematic diagram of the elements of a device in accordance with this invention, illustrating the operation of the device.

Referring to the schematic diagram in FIG. 1, location 0 represents the cornea of a patient's eye into which a flat beam of light, being the image of an illuminated slit diaphragm, is to be directed. The slit image is generated by a bisectional projection lens system, which consists of a lower lens 1a and an upper lens 1b on the same optical axis, and is focused by the upper lens 1b onto a reflector R which is pivoted to direct the incident radiation to the location 0. The lower lens 1a is positioned in line with a slit diaphragm D so that the slit is at the focal point of the lower lens 1a to produce a parallel path of rays to the upper lens 1b. Thus the upper lens can be moved relative to the lower lens 1a along their common optical axis for focusing the slit image on the location 0, the image being reflected to the location 0 by the reflector R.

In the full line position of the elements illustrated in FIG. 1 the upper lens 1b is in position to focus the slit image on location 0 when the reflector R is in the horizontal plane of location 0 and is tilted to direct the slit image to location 0 at a 45° angle relative to the optical axis through the lenses 1a and 1b.

Pursuant to a principal object of the invention, it is desired to be able to change the angle of incidence at which the light beam from reflector R is received at location 0 while maintaining the slit image in sharp focus on location 0. This angle of incidence, which is hereafter referred to as the vertical angle, is changed and adjusted in a device in accordance with the invention by moving the reflector R along the optical axis of lenses 1a and 1b while pivoting it as required to keep the incident beam directed to location 0, which is stationary. At the same time the upper lens 1b is moved along its optical axis the distance necessary to maintain the slit image in focus on the location 0. That is, the focal distance, 1b to R to 0 must be the same for all positions of R.

In FIG. 1, when the reflector R is moved down distance $a$ from its full line position to its dash line position, the vertical angle changes by $\alpha°$ and the reflector R is tilted $\alpha/2°$ for the image to be directed to location 0. At the same time, in order to maintain the slit image in focus on location 0, the lens 1b is moved down along its optical axis a distance a–b. As indicated, b represents the increase in the distance between 0 and R when the reflector R is moved down from its full line position. The value for b is determined empirically and in devices embodying the invention, as illustrated by the embodiments shown in FIGS. 2 and 4, the aforementioned relative movements—the movements of the reflector R and lens 1b along the optical axis and the tilting of reflector R—are carried out simultaneously by gears or cams.

Figure 2:
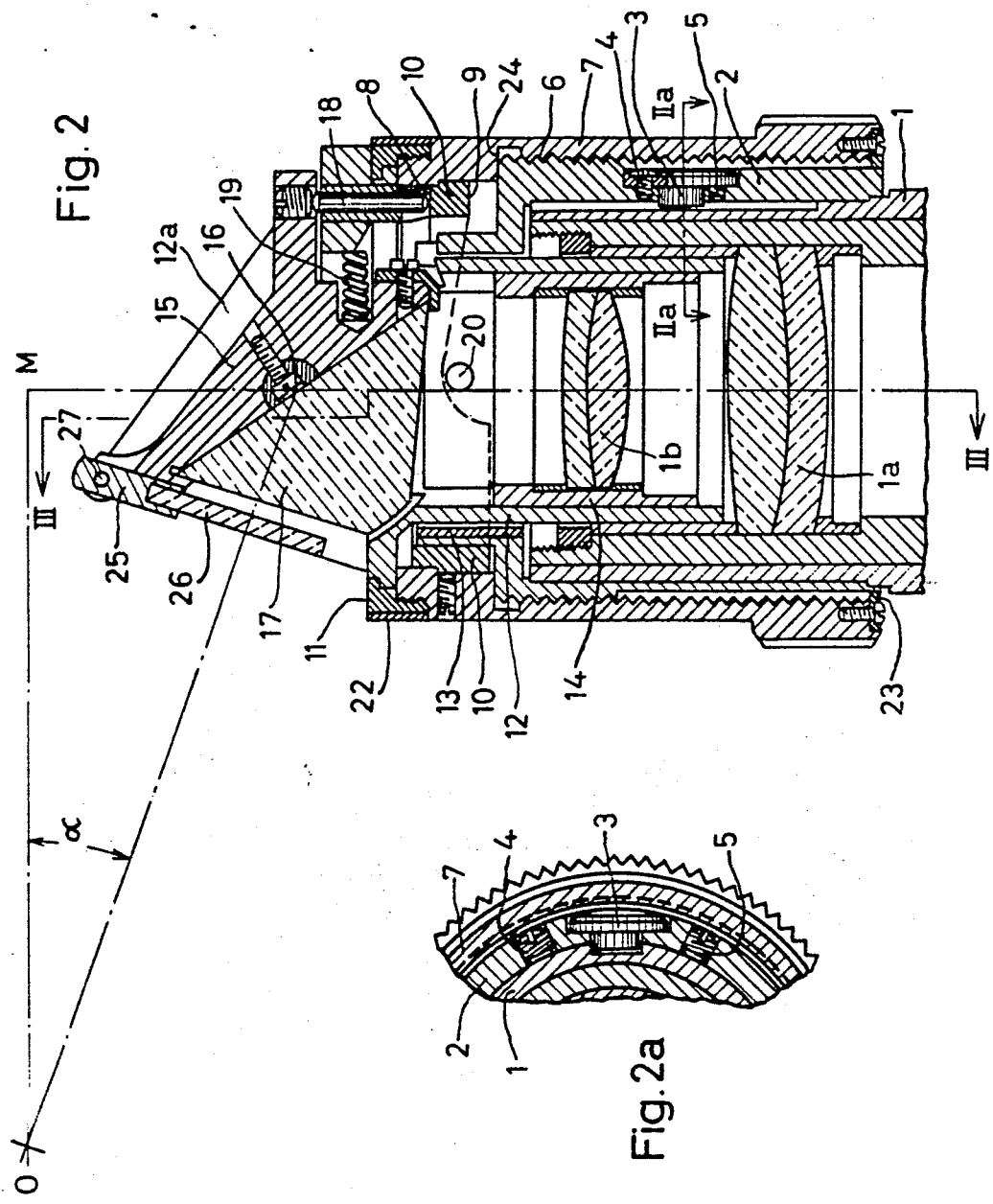
FIG. 2 is a vertical section through one embodiment of a device of this invention.

In the embodiment illustrated in FIG. 2 a sleeve 2 is received on the end of a tube 1 of a slit lamp in which the lens 1a is mounted and the longitudinal position of the sleeve 2 on the tube 1 is adjustable by a pin 3 on the sleeve 2 projecting into a longitudinal groove in the tube 1. The adjusted position is fixed by set screws 4 and 5 carried in sleeve 2 to be tightened against the periphery of tube 1.

An outer sleeve 7 is threaded onto inner sleeve 2 by course threads 6 so as to be able to screw the outer sleeve 7 relatively up and down on the inner sleeve 2. The upward movement of outer sleeve 7 is limited by a flange ring 23 on its bottom and which extends into an undercut portion of the periphery of the inner sleeve 2 and stops against the upper end of the latter undercut portion at the uppermost position of the outer sleeve 7. Downward movement of outer sleeve 7 is limited by an inner shoulder 24 on the outer sleeve 7 coming down against an outer matching shoulder at the upper portion of the inner sleeve 2.

The upper lens 1b is mounted in a tubular lens mount 14 which is carried in the tubular carrier 12 to move vertically, but not rotate, therein. The upper end of the carrier 12 is connected to the outer sleeve 7 by a ring 11 in such a way that the outer sleeve 7 is adapted to rotate around the carrier 12 while moving the carrier 12 up or down relative to the inner sleeve 2 when the outer sleeve 7 is turned, and a tongue 13 carried in the outer sleeve 2 slidably engages a vertical groove in the periphery of the inner sleeve 2 to prevent rotation of the carrier 12 around the inner sleeve 2 while permitting the carrier 12 to move up or down with the outer sleeve 7.

A reflector 17, which may be a mirror, or a prism as shown, is mounted in a holder 15 which is tiltably supported above the carrier 12 by an axle 16 through the holder 15 and journalled between extensions 12a projecting up from the opposite sides of the carrier 12.

A cam ring 10 mounted in the inside of the upper end of the outer sleeve 7 by a set screw has a top cam surface 8 and a bottom cam surface 9 adapted respectively to tilt the reflector holder 15 and move the lens mount 14 axially up or down within the carrier 12 in response to rotation of the outer sleeve 7. The tilting of holder 15 is accomplished by means of a vertical pin 18 slidably mounted in an upper extension of the carrier 12 with the bottom end of the pin 18 riding on the cam surface 8 and its top end against a set screw in a rearward projection of the holder 15. A coil spring 19 is provided between the holder 15 and the upper extension of the carrier 12 to hold the rearward projection of the holder 15 resiliently down against the pin 18.

Figure 3:
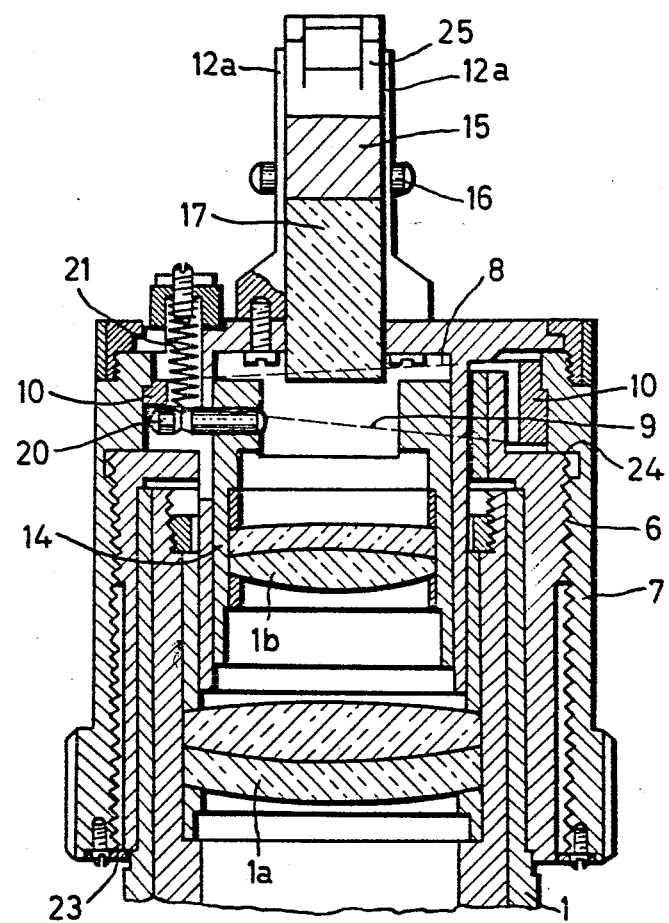
FIG. 3 is another vertical section through the embodiment of FIG. 2, taken 90° from the view of FIG. 2.

For axially moving the lens mount 14 by movement of the cam surface 9, a pin 20 mounted horizontally through the wall of the lens mount 14 extends outward under the cam surface 9 and a spring 21 (FIG. 3) is provided to resiliently urge the lens mount 14 upward in the carrier 12 for holding the pin 20 against the cam surface 9.

Thus rotation of the outer sleeve 7 to move up or down relative to the inner sleeve 2 by the thread 6 similarly moves the carrier 12, and the lens mount 14 and reflector holder 15 carried thereby are moved up or down in the direction of the optical axis of the lens 1b (and of the lens 1a). The carrier 12, lens mount 14, and reflector holder 15 do not rotate. The lens mount 14 (and lens 1b therein) is moved up or down within the carrier 12 under the control of the cam surface 9 bearing against the pin 20 on the lens mount 14, and the reflector holder 15 is tilted by the movement of the pin 18 riding on the cam surface 9. The cam surface 9 is made so that the reflector is tilted in a manner to keep the slit image it reflects from the lens 1a and 1b directed to the location 0 as the carrier 12 is moved up or down for changing the angle of incidence at which the slit image strikes location 0. The cam surface 8 is made to adjust the axial position of the lens mount 14, and lens 1b, for maintaining the slit image projected by lens 1b in focus on the reflector 17 as the latter is moved up or down with the carrier 12 for changing the aforesaid angle of incidence.

A mount 25 pivotally mounted on the reflector holder 15 to pivot about an axis 27 is adapted to carry a plate 26, which may be a filter, a ground glass or the like, for swinging the plate 26 into or out of the path of the rays reflected from the reflector 17 if desired.

Figure 4:
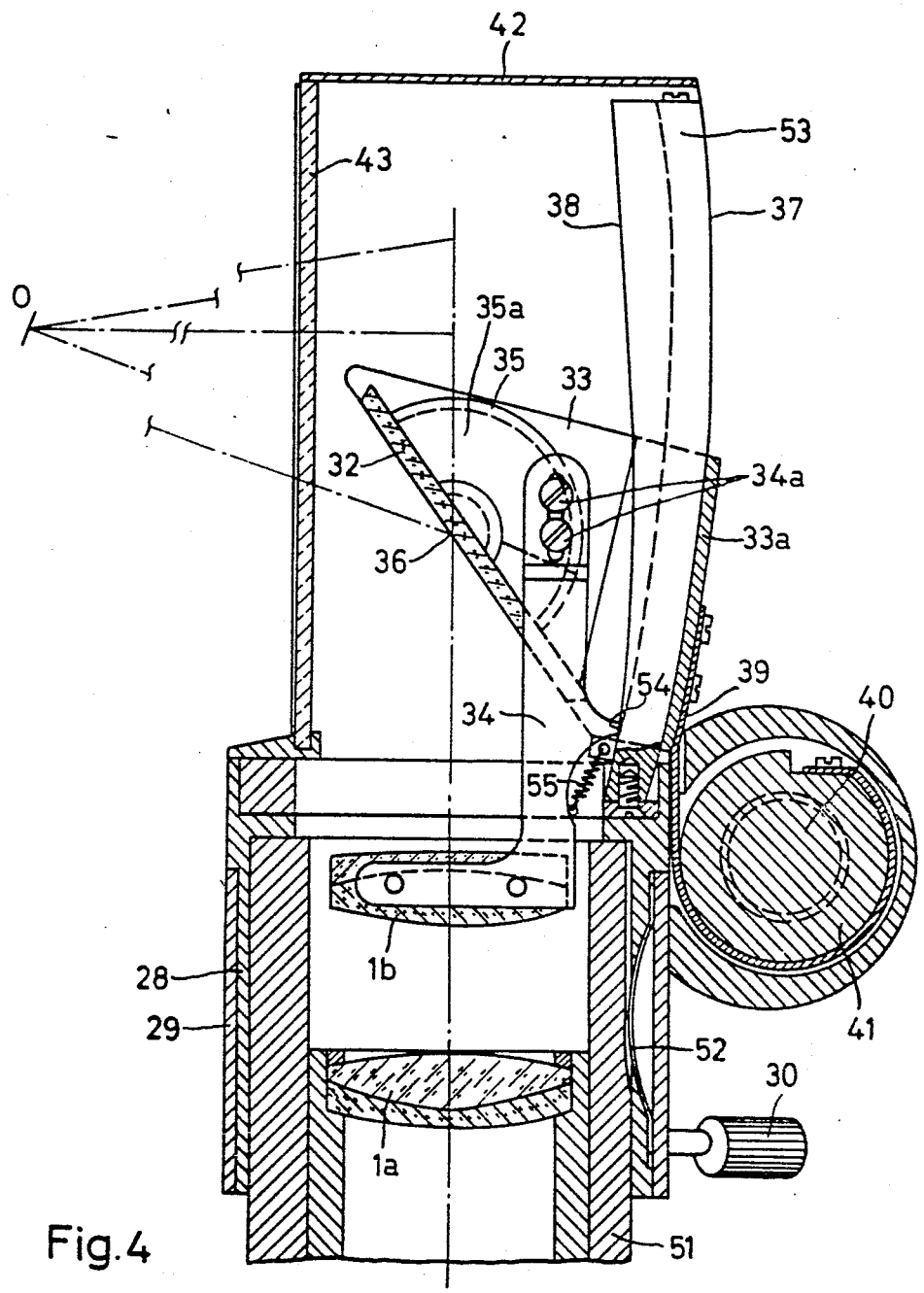
FIG. 4 is a vertical section through another embodiment of a device of this invention.

In another embodiment illustrated in FIG. 4 a sleeve 28 is received over the end of a tube 51 of a slit lamp in which the lens 1a is mounted. An outer sleeve 29 is around the sleeve 28 and the position of the sleeves 28 and 29 on the tube 51 is adjustably fixed by a leaf spring 52 between the sleeves projecting into a vertical groove in the tube 51 and by a set screw 30 through the sleeves for tightening against the tube 51 to fix the longitudinal position of adjustment.

An elongated cam element 53 mounted on the sleeve 28 projects upward therefrom and has cam surfaces 37 and 38 respectively at opposite edges thereof.

A reflector 32 is mounted in a reflector carrier 33 which has a rear wall 33a riding on the cam surface 37 by a stiff steel band 39 which is attached at one end to the back of the wall 33a of carrier 33 and which has its other end wound onto a reel 41 which is turned by a knob 40 for unwinding or winding the steel band 37 to move the carrier 33 respectively up or down the cam surface 37.

The position of the reflector 32 in the carrier 33 and the configuration of the cam surface 37 are such that up and down movement of the carrier 33 causes the reflection point 36 of the reflector 32 to move up and down along the optical axis of the lens 1b and swing relatively about its reflection 36 as required for it to direct the reflection of a split image to the location 0 in various vertical positions of the reflector 32.

The upper lens 1b is supported so as to move up and down with the reflector carrier 33 by means of an L-shaped lens carrier 34, in the lower end of which the lens 1b is mounted with its optical axis coinciding with the optical axis of lens 1a. The reflector carrier 33 has a cut-out segment 35 in which a sector 35a is supported to rotate freely therein and the lens carrier 34 is carried on the reflector carrier 33 by a pair of screws 34a received loosely through a vertical slot in the upper end of the lens carrier 34 and threaded into the sector 35a. A projection 54 on the lens carrier 34 rides on the cam surface 38 and is resiliently held in engagement therewith by a spring 55 tensioned between the lens carrier 34 and the reflector carrier 33. The configuration of the cam surface 38 is such that, as the reflector carrier 33 is moved up or down for changing the angle of reflection to the location 0, the lens carrier 34, which is carried up by the sector 35 on the reflector carrier 33, is additionally moved up or down by the cam surface 38 as required to maintain the slit image passing through lens 1b in focus on the location 0 in the different vertical positions of the reflector 32. That is, the cam surface 38 causes the lens 1b to move the distance b (referred to in connection with FIG. 1) when the reflector 32, carrying the lens carrier 34 and lens 1b, moves distance a, the total movement of lens 1b thus being a–b. As the lens carrier 34 moves up and down relatively along the cam surface 38, it is adapted to shift laterally and vertically to assume the desired relative position and alignment by the loose connection to the reflector carrier 33 provided by the sector 35a and screws 34a.

The optical and movable mechanical elements of the device, including the lenses 1a and 1b, the reflector 32 and the carriers 33 and 34, are protected by a hood 42, which has an open front in which a plate 43, such as a filter or ground glass may be mounted in the path of the reflection of the slit image to the location 0.

What is claimed is:

1. A slit lamp device for directing a beam of light from a light source to an eye to be examined comprising a slit diaphragm, a first lens for projecting illumination passing through said slit diaphragm as parallel rays along its optical axis, a second, focusing, lens having its optical axis coaxial with the optical axis of the first lens and means for moving said second lens along said optical axis for focusing said rays on said eye, said reflector means positioned along said optical axis and means for pivotally mounting said reflector means for directing said rays to said eye and means for moving said reflector means along said optical axis for changing the angle at which it directs the rays to said eye wherein said reflector moving means includes means for simultaneously moving the reflector relatively along the optical axis of the second lens, moving the second lens along its optical axis to maintain said rays in focus on the eye, and pivoting the reflector to maintain the rays directed to said eye.

2. The device of claim 1 including first means for moving the reflector and second lens along the optical axis of the first lens, second means actuated by said movement of the first means for pivoting the reflector an amount relative to the amount of movement of the reflector along said axis, and third means actuated by said movement of the first means for additionally moving the second lens along said optical axis an amount relative to the amount of movement of the reflector along said axis.

3. The device of claim 2 in which said second means includes means for pivoting the reflector an amount to change the angular position of the reflector to reflect rays from the said lenses to a single fixed point spaced therefrom in different successive positions of the reflector along said axis.

4. The device of claim 2 in which said third means includes means for additionally moving the second lens along said optical axis an amount to locate the focal point of the second lens on the eye in different successive positions of the reflector along said axis.

5. The device of claim 1 in which said first lens is mounted in a slit lamp tube and which includes: an outer sleeve around the end portion of the slit lamp tube, screw thread means for mounting an outer sleeve around the end portion of the slit lamp tube for simultaneous movement around and along the slit lamp tube, a carrier tube slidable in the end of the slit lamp tube, a lens mounting tube slidable in the carrier tube and mounting said second lens in coaxial optical alignment with the first lens, said outer sleeve and said carrier tube being connected for the outer sleeve to move the carrier tube in a longitudinal direction while rotating around the carrier tube, means preventing rotation of the carrier tube relative to the slit lamp tube, a reflector tiltably mounted on the carrier tube in line to receive an image projected through the second lens from the first lens, and reflect the image to a point spaced therefrom, first and second cam surfaces on the outer sleeve to rotate therewith, means connected with the reflector for resiliently engaging the first cam surface and for changing the tilt of the reflector as the outer sleeve and first cam surface rotate, and means connected with the lens mounting tube and engaging the second cam surface for moving the lens mounting tube longitudinally within the carrier tube as the outer sleeve and first cam surface rotate, whereby said simultaneous rotation and longitudinal movement of the outer sleeve move the reflector and second lens along the axis of the second lens and at the same time tilts the reflector and moves the second lens another longitudinal amount relative to the longitudinal movement of the sleeve.

6. The device of claim 5 in which said first cam surface is contoured for changing the tilt of the reflector to maintain the reflection of said image directed to said point as the reflector is moved along the axis of the second lens by said movement of the sleeve.

7. The device of claim 5 in which said second cam surface is contoured for changing the longitudinal position of the lens mounting tube within the carrier tube to maintain said image in focus on the eye as the reflector and carrier tube are moved along the axis of the second lens by said movement of the sleeve.

8. The device of claim 1 in which said first lens is mounted in a slit lamp tube and which includes: an elongated cam element mounted to extend longitudinally from the end of said tube, first and second cam surfaces longitudinally along the cam element, a reflector carrier mounting said reflector in line with the optical axis of the lenses for receiving an image projected therethrough and being supported for movement along said first cam surface, means for moving the reflector carrier along said first cam surface, said first cam surface being contoured to maintain the reflector in line with said axis and to change the angle of the reflector relative to said axis as the reflector carrier moves therealong, a lens carrier mounting said second lens and being supported on the reflector carrier for relative movement generally up and down thereon, said lens carrier having a surface engaging the second cam surface, and said second cam surface being contoured for raising and lowering the lens carrier, and the second lens thereon, relative to the reflector carrier as the reflector carrier is moved respectively up and down along the first cam surface.

9. The device of claim 8 in which said first cam surface is contoured for changing the angle of the reflector to maintain the reflection of said image directed to a point spaced from the reflector, and said second cam surface is contoured for changing the vertical position of the lens carrier to maintain the image projected through said second lens in focus on the eye, as the reflector carrier is moved along the first cam surface.

References Cited

UNITED STATES PATENTS 3,405,994   10/1968   Altman et al.

DAVID SCHONBERG, Primary Examiner

P. A. SACHER, Assistant Examiner

U.S. Cl. X.R.

351—16